(12) United States Patent
Nah

(10) Patent No.: US 8,043,749 B2
(45) Date of Patent: Oct. 25, 2011

(54) ELECTROLYTE FOR LITHIUM ION SECONDARY BATTERY AND LITHIUM ION SECONDARY BATTERY COMPRISING THE SAME

(75) Inventor: Jaehou Nah, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 188 days.

(21) Appl. No.: 12/510,333

(22) Filed: Jul. 28, 2009

(65) Prior Publication Data

US 2010/0028783 A1 Feb. 4, 2010

(30) Foreign Application Priority Data

Aug. 1, 2008 (KR) .................. 10-2008-0075498

(51) Int. Cl.
*H01M 6/18* (2006.01)

(52) U.S. Cl. ........ 429/314; 429/310; 429/317; 429/338; 429/337; 429/341; 429/342; 429/343; 429/330; 429/199; 429/200; 429/332; 252/62.2

(58) Field of Classification Search .............. 429/314, 429/310, 317, 338, 337, 341, 342, 343, 330, 429/199, 200, 332; 252/62.2
See application file for complete search history.

(56) References Cited

U.S. PATENT DOCUMENTS

| 5,709,968 | A | 1/1998 | Shimizu |
| 5,879,834 | A | 3/1999 | Mao |
| 6,379,846 | B1 * | 4/2002 | Terahara et al. ............ 252/62.2 |
| 2006/0188724 | A1 | 8/2006 | Moriyama et al. |
| 2006/0199080 | A1 | 9/2006 | Amine et al. |
| 2007/0048622 | A1 | 3/2007 | Yoon et al. |
| 2007/0224515 | A1 | 9/2007 | Xu et al. |

FOREIGN PATENT DOCUMENTS

| JP | 02-244565 | 9/1990 |
| JP | 09-082293 | 3/1997 |
| JP | 09-087369 | 3/1997 |
| JP | 2004-269599 | 9/2004 |
| KR | 1020050104372 A | 11/2005 |
| KR | 10-2006-0014280 | 2/2006 |
| KR | 10-2007-0023450 | 2/2007 |
| WO | WO 01/29920 A1 | 4/2001 |
| WO | WO 2005/117175 A2 | 12/2005 |
| WO | WO 2006/094069 A2 | 9/2006 |
| WO | WO 2007/092102 A2 | 8/2007 |

OTHER PUBLICATIONS

Patent Abstracts of Japan, and English machine translation of Japanese Publication 09-082293, listed above, 13 pages.
Journal of Power Sources 162 (2006) 1379-1394, "A review of electrolyte additives for lithium-ion batteries".
English Machine Translation Patent Abstracts of JP 09-087369.
English Machine Translation Patent Abstracts of JP 2004-269599.
Korean Notice of Allowance date Oct. 25, 2010 issued by the KIPO for corresponding Korean Patent Application No. 10-2008-0075498, 5 pages.

* cited by examiner

*Primary Examiner* — Laura Weiner
(74) *Attorney, Agent, or Firm* — Christie, Parker & Hale, LLP

(57) ABSTRACT

An electrolyte for a lithium ion secondary battery and a lithium ion secondary battery comprising the electrolyte. The electrolyte comprises a non-aqueous organic solvent, a lithium salt, and at least one aromatic phosphate compound. Exothermic reactions are inhibited in the battery upon overcharge or during high-temperature storage to prevent an increase in the temperature of the battery, resulting in an improvement in safety. In addition, the battery exhibits good swelling stability during high-temperature storage as well as improved cycle life characteristics. The electrolyte further comprises an ethylene carbonate-based compound. The presence of the ethylene carbonate-based compound leads to further improvements in the overcharge safety, high-temperature safety and cycle life characteristics of the battery.

20 Claims, 1 Drawing Sheet

ELECTROLYTE FOR LITHIUM ION SECONDARY BATTERY AND LITHIUM ION SECONDARY BATTERY COMPRISING THE SAME

CROSS-REFERENCE TO RELATED APPLICATION

This application claims the benefit of Korean Application No. 2008-75498, filed Aug. 1, 2008 in the Korean Intellectual Property Office, the disclosure of which is incorporated herein by reference.

BACKGROUND OF THE INVENTION

1. Field of the Invention

Aspects of the present invention relate to an electrolyte for a lithium ion secondary battery and a lithium ion secondary battery comprising the electrolyte. More specifically, aspects of the present invention relates to an electrolyte for a lithium ion secondary battery that uses at least one aromatic phosphate compound to achieve improved characteristics in terms of overcharge safety, high-temperature safety and excellent life cycle characteristics, as well as a lithium ion secondary battery comprising the electrolyte.

2. Description of the Related Art

During the initial charge of a lithium ion battery, a solid electrolyte interface (SEI) film, also called a passivation layer, is formed on the surface of a graphite negative electrode. Once the SEI film is formed, lithium ions are prevented from undergoing side reactions with the graphite negative electrode or other materials and the amount of the lithium ions in the electrolyte is reversibly maintained, resulting in the maintenance of stable charge/discharge characteristics. The SEI film slowly collapses during high-temperature exposure in a fully charged state with the passage of time, and as a result, the surface of the negative electrode is exposed. The exposed portions of surface of the negative electrode continuously react with the surrounding electrolyte to release gases. This continuous gas release increases the internal pressure of the battery. Particularly, the thickness of a prismatic battery increases because of the gas release.

Further, when a lithium ion secondary battery is overcharged, excessive precipitation and insertion of lithium occur in both the positive and negative electrodes of the battery, resulting in thermal instability of the electrodes. This thermal instability may induce rapid exothermic thermal decomposition reactions between the electrodes and the electrolyte. In an extreme case, thermal runaway may occur, posing a danger of rupture of the battery as well as fire.

To solve the above problems, methods have been developed for the preparation of electrolytes using aromatic compounds as redox shuttle additives. For example, U.S. Pat. No. 5,709,968 discloses a non-aqueous lithium ion battery using a benzene-related compound such as 2,4-difluoroanisole to interrupt the overcharge current and therefore prevent thermal runaway occurring because of the overcharge current. Further, U.S. Pat. No. 5,879,834 describes a method for improving the safety of a battery by incorporating small amounts of suitable aromatic additives such as biphenyl, 3-chlorothiophene and furan into an electrolyte. The additives are electrochemically polymerized at abnormally high voltages to increase the internal resistance of the battery. These redox shuttle additives increase the internal temperatures of batteries at the early stages due to heat generated by exothermic oxidation reactions. The early increased temperature serves to rapidly and uniformly block pores of separators inserted in the batteries to suppress overcharge reactions. Another function of the redox shuttle additives is that polymerization of the additives on the surface of positive electrodes consumes the overcharge current during overcharge to protect the batteries. However, the overcharge current cannot be sufficiently removed by the polymerization of the additives and large amounts of gases are still released from the decomposition of the additives due to redox reactions and therefore continue to cause severe swelling of the batteries.

SUMMARY OF THE INVENTION

Aspects of the present invention provide an electrolyte for a lithium ion secondary battery that is safe even when overcharged, has good high-temperature safety (including swelling stability) and exhibits improved cycle life characteristics. Another aspect of the present invention provides a lithium ion secondary battery comprising the electrolyte.

An embodiment of the present invention provides an electrolyte for a lithium ion secondary battery that comprises a non-aqueous organic solvent, a lithium salt, and at least one aromatic phosphate compound represented by Formula 1:

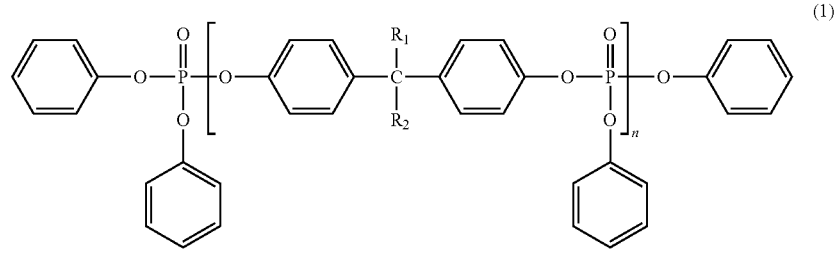

wherein n is a number from 1 to 10, and $R_1$ and $R_2$ are each independently a $C_1$-$C_5$ alkyl group. According to another aspect of the present invention, the electrolyte may comprise a mixture of two or more aromatic phosphate compounds of Formula 1 with different n values.

According to another aspect of the present invention, the aromatic phosphate compound may be present in an amount of 0.5 to 5 parts by weight, based on 100 parts by weight of the electrolyte. According to another aspect of the present invention, the aromatic phosphate compound has an endothermic peak as determined by differential thermal analysis whose lowest point is in the range of 50 to 90° C.

According to another aspect of the present invention, the electrolyte may further comprise an ethylene carbonate-based compound represented by Formula 2:

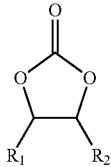

(2)

wherein $R_1$ and $R_2$ are each independently selected from the group consisting of hydrogen, halo, cyano (CN), nitro ($NO_2$), vinyl and $C_1$-$C_5$ fluoroalkyl However, $R_1$ and $R_2$ are not both hydrogen. According to an aspect of the present invention, the non-aqueous organic solvent may be at least one solvent selected from the group consisting of carbonates, esters, ethers, ketones.

According to another aspect of the present invention, the lithium salt may be at least one compound selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, $LiN(C_pF_{2p+1}SO_2)(C_qF_{2q+1}SO_2)$ (p and q are natural numbers), LiCl, and LiI.

Another embodiment of the present invention provides a lithium ion secondary battery that comprises the electrolyte as described above, a positive electrode including a positive electrode active material capable of reversibly inserting or removing lithium, and a negative electrode including a negative electrode active material capable of reversibly inserting or removing lithium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
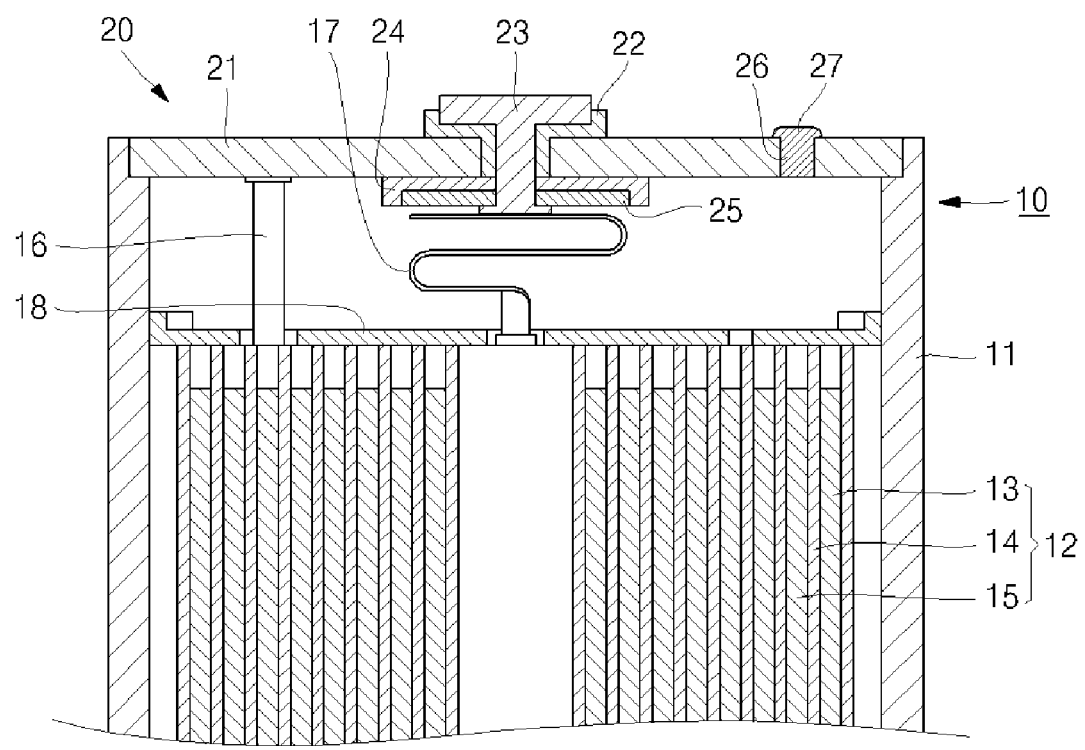
FIG. 1 illustrates a rectangular type lithium ion secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the FIGURE.

Aspects of the present invention provide an electrolyte for a lithium ion secondary battery that comprises a non-aqueous organic solvent, a lithium salt and at least one aromatic phosphate compound represented by Formula 1:

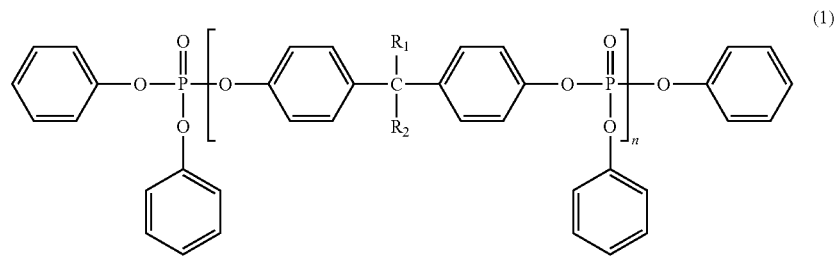

(1)

wherein n is a number from 1 to 10 and $R_1$ and $R_2$ are each independently a $C_1$-$C_5$ alkyl group.

The aromatic phosphate compound is thermally decomposed to form a polyphosphate. The polyphosphate is an inert polymer and undergoes esterification and dehydrogenation to form a carbon layer. The carbon layer serves as a barrier against oxygen and heat to protect the battery from temperature increase and fire. In addition, the polyphosphate bonds to oxygen generated from the decomposition of the positive electrode to inhibit side reactions and exothermic thermal decomposition reactions. The inhibition of exothermic reactions leads to the prevention of thermal runaway, resulting in an improvement in the safety of the battery upon overcharge or during high-temperature storage. The inhibition of side reactions leads to a reduction in the amount of gases released, resulting in an improvement in swelling stability.

In an embodiment, the aromatic phosphate compound may be present in a concentration of 0.5 to 5 parts by weight, based on 100 parts by weight of the electrolyte. A concentration of the aromatic phosphate compound of less than 0.5 parts by weight fails to prevent thermal runaway arising from overcharge. On the other hand, a concentration of the aromatic phosphate compound exceeding 5 parts by weight may remain undissolved in the electrolyte.

In another embodiment, the electrolyte of the present invention may comprise a mixture of two or more aromatic phosphate compounds of Formula 1 with different n values. The mixture of different aromatic phosphate compounds is also effective in improving the overcharge safety and high-temperature safety of the battery, and the mixing ratio thereof may be appropriately determined. The aromatic phosphate compound has an endothermic peak as determined by differential thermal analysis whose lowest point is in the range of 50 to 90° C.

Various kinds of additives may also be used to improve the overcharge safety of the battery, but most additives gradually decompose above 40° C. The decomposition of the additives induces exothermic reactions or leaves impurities that adversely affect the characteristics of the battery. The aromatic phosphate compound is in the form of a solid at around 40° C. and, as stated above, has an endothermic peak as determined by differential thermal analysis whose lowest point is in the range of 50 to 90° C. That is, the aromatic phosphate compound is melted by heat absorption in the temperature range of 50 to 90° C. The presence of the aromatic phosphate compound in the electrolyte protects the battery from the danger of fire or explosion.

Furthermore, the addition of the aromatic phosphate compound improves the thermal safety of the battery below 100° C. A separator of a lithium ion secondary battery is typically made of an olefin resin such as polyethylene or polypropylene with a melting point of 110 to 130° C. When the internal temperature of the battery exceeds 130° C., the normally porous membrane of the separator is blocked to prevent fire and/or combustion of the battery. Meanwhile, below 100° C., the aromatic phosphate compound itself absorbs the internal heat of the battery to contribute to the prevention of fire and/or combustion. Therefore, improvements in the overcharge safety and high-temperature safety of the battery are accomplished by the use of the aromatic phosphate compound in the electrolyte.

To further improve the overcharge safety and high-temperature safety of the battery while increasing the cycle life of the battery, the electrolyte of the present invention may further comprise an ethylene carbonate-based compound represented by Formula 2:

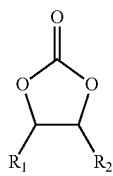

(2)

wherein $R_1$ and $R_2$ are each independently selected from the group consisting of hydrogen, halo, cyano (CN), nitro ($NO_2$), vinyl and $C_1$-$C_5$ fluoroalkyl. However, $R_1$ and $R_2$ are not both hydrogen.

Representative examples of the ethylene carbonate-based compound include substituted ethylene carbonate compounds, including halogenated ethylene carbonate compounds such as difluoroethylene carbonate, chloroethylene carbonate, dichloroethylene carbonate, bromoethylene carbonate, dibromoethylene carbonate and fluoroethylene carbonate, as well as nitroethylene carbonate and cyanoethylene carbonate. Fluoroethylene carbonate is preferred. The substituted ethylene carbonate compound is used to form a highly stable film on the surface of the negative electrode during the initial charge of the battery or on the surface of electrode active materials when the battery is exposed to high temperature. This film formation prevents a loss of lithium caused by the reactions of lithium with the electrolyte and increases the oxidative decomposition voltage of the electrolyte to prevent the decomposition of the electrolyte. As a result, deterioration in the cycle characteristics of the battery can be prevented. Further, the combined use of the substituted ethylene carbonate and the aromatic phosphate compound creates synergistic effects to improve the safety of the battery upon overcharge or exposure to high temperature. The amount of the optional additive can be appropriately determined to improve the cycle life characteristics of the battery.

The non-aqueous organic solvent used in the electrolyte of aspects of the present invention functions as a medium through which ions involved in the electrochemical reactions of the battery can migrate. Suitable non-aqueous organic solvents include, but are not limited to, at least one compound selected from the group consisting of carbonates, esters, ethers and ketones. Suitable carbonate-based solvents include, but are not limited to, dimethyl carbonate (DMC), diethyl carbonate (DEC), dipropyl carbonate (DPC), methyl propyl carbonate (MPC), ethyl propyl carbonate (EPC), ethyl methyl carbonate (EMC), ethylene carbonate (EC), propylene carbonate (PC), butylene carbonate (BC) and pentylene carbonate. Suitable ester-based solvents include, but are not limited to, methyl acetate, ethyl acetate, n-propyl acetate, butyl acetate, methyl propionate, ethyl propionate, γ-butyrolactone, decanolide, γ-valerolactone, δ-valerolactone, mevalonolactone and caprolactone. Suitable ether-based solvents include, but are not limited to, dibutyl ether, tetraglyme, diglyme, dimethoxyethane, 2-methyltetrahydrofuran and tetrahydrofuran. Suitable ketone-based solvents include, but are not limited to, cyclohexanone and polymethyl vinyl ketone.

These non-aqueous organic solvents may be used alone or as a mixture of two or more thereof. The mixing ratio of two or more non-aqueous organic solvents may be varied depending on the desired performance of the battery. The organic solvent has a high dielectric constant and a low viscosity sufficient to increase the degree of dissociation of the ions, thus achieving smooth conduction of the ions. Generally, it is preferred to use a mixture of a solvent with a high dielectric constant and a high viscosity and a solvent with a low dielectric constant and a low viscosity. As for the carbonate-based solvents, a mixture of a cyclic carbonate and a chain carbonate is preferred. In this case, the mixing ratio of the cyclic carbonate to the chain carbonate is preferably from 1:1 (v/v) to 1:9 (v/v), taking into consideration the performance of the electrolyte.

The non-aqueous organic solvent may further comprise an aromatic hydrocarbon-based organic solvent in addition to the carbonate-based solvents. The aromatic hydrocarbon-based organic solvent may be represented by Formula 3:

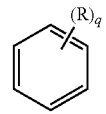

(3)

wherein R is a halogen atom or a $C_1$-$C_{10}$ alkyl group and q is an integer from 0 to 6.

Specific examples of the aromatic hydrocarbon-based organic solvent include benzene, fluorobenzene, bromobenzene, chlorobenzene, toluene, xylene and mesitylene. These organic solvents may be used alone or as a mixture thereof. When the volume ratio of the carbonate solvent to the aromatic hydrocarbon-based organic solvent is from 1:1 to 30:1, better results are obtained in terms of safety, stability and ionic conductivity, which are typical characteristics required in the electrolyte.

The lithium salt used in the electrolyte according to this aspect of the present invention is a source of lithium ions to enable the basic operation of the lithium ion secondary battery and plays a role in promoting the mobility of the lithium ions between the positive electrode and the negative electrode. The lithium salt can be at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, $LiN(C_pF_{2p+1}SO_2)(C_qF_{2q+1}SO_2)$ (p and q are natural numbers), LiCl and LiI. Preferably, the lithium salt has a low lattice energy and a high degree of dissociation, indicating high ionic conductivity, and is thermally stable and highly resistant to oxidation. The lithium salt is preferably present at a concentration of 0.1 to 2.0 M. If the lithium salt is present at a concentration of less than 0.1 M, the conductivity of the electrolyte is low, resulting in a deterioration in the performance of the electrolyte. On the other hand, if the lithium salt is present at a concentration of more than 2.0 M, the electrolyte is viscous, resulting in a reduction in the mobility of the lithium ions.

Aspects of the present invention also provide a lithium ion secondary battery that comprises the electrolyte, a positive electrode plate, a negative electrode plate and a separator. The positive electrode plate includes a positive electrode active material capable of reversible insertion or removal of lithium ions. The positive electrode active material is preferably a composite metal oxide of lithium and at least one metal selected from cobalt, manganese and nickel. There is no particular restriction on the ratio of the metals employed. In addition to these metals, at least one element selected from the group consisting of Mg, Al, Co, K, Na, Ca, Si, Ti, Sn, V, Ge, Ga, B, As, Zr, Mn, Cr, Fe, Sr, V and rare earth elements may be further included in the positive electrode active material.

The negative electrode plate includes a negative electrode active material capable of reversible insertion or removal of lithium ions. The negative electrode active material can be a carbonaceous negative electrode active material, such as crystalline or amorphous carbon, a carbon composite (e.g., thermally decomposed carbon, coke or graphite), a sintered organic polymer compound, a carbon fiber, a tin oxide compound, a lithium metal, or a lithium alloy.

Examples of the amorphous carbon include hard carbon, coke, mesocarbon microbeads (MCMBs) calcined at 1,500° C. or less, and mesophase pitch-based carbon fibers (MPCFs). The crystalline carbon is a graphite-based material, and specific examples thereof include natural graphite, graphitized coke, graphitized MCMBs and graphitized MPCFs.

The positive electrode plate or the negative electrode plate can be produced by dispersing the corresponding electrode active material, a binder, a conductive material and optionally a thickener in a solvent to prepare an electrode slurry composition, and applying the slurry composition to an electrode collector. Aluminum or its alloy can usually be used as a positive electrode collector and copper or its alloy can usually be used as a negative electrode collector. The electrode collectors may be in the form of foils or meshes.

The separator serves to prevent short circuits between the positive electrode plate and the negative electrode plate. Any number of materials may be used as the separator, and examples thereof include polymer membranes, such as polyolefin, polypropylene and polyethylene membranes, multiple membranes thereof, microporous films, woven fabrics and non-woven fabrics.

The lithium ion battery of aspects of the present invention may have the following cell structures: a unit cell composed of positive electrode plate/separator/negative electrode plate, a bicell composed of positive electrode plate/separator/negative electrode plate/separator/positive electrode plate, and a laminate cell composed of two or more repeating unit cells.

FIG. 1 illustrates a representative structure 10 of the lithium ion secondary battery according to a preferred embodiment of the present invention. Referring to FIG. 1, the prismatic lithium ion secondary battery 10 comprises a can 11, an electrode assembly 12 accommodated in the can 11, and a cap assembly 20 coupled to an open upper end of the can 11 to seal the can 11. The can 11 is a prismatic metal case having a space therein.

The electrode assembly 12 includes a negative electrode plate 13, a separator 14 and a negative electrode plate 15 wound in the form of a 'jelly-roll'. A positive lead 16 and a negative lead 17 are drawn from the positive electrode plate 13 and the negative electrode plate 15, respectively.

The cap assembly 20 includes a cap plate 21 coupled to the top of the can 11, a negative terminal 23 inserted into the cap plate 21 via a gasket 22, an insulating plate 24 installed on the lower surface of the cap plate 21, and a terminal plate 25 installed on the lower surface of the insulating plate 24 to be in electrical communication with the negative terminal 23.

The cap plate 21 is formed with an electrolyte injection hole 26 to provide a passage through which the electrolyte is injected into the can 11. The electrolyte is injected through the electrolyte injection hole 26. After completion of the electrolyte injection, the electrolyte injection hole 26 is closed by a ball 27. An insulating case 18 is installed on the electrode assembly 12 within the can 11 to insulate the electrode assembly 12 from the cap assembly 20.

The type of the lithium ion battery is not limited to the prismatic structure. For example, the lithium ion battery of the present invention may be of any type, such as a cylinder or a pouch.

Hereinafter, the present invention will be explained in detail with reference to the following examples, including comparative examples. However, these examples are given merely for the purpose of illustration and are not intended to limit the present invention.

EXAMPLES

Example 1

$LiCoO_2$ as a positive electrode active material, polyvinylidene fluoride (PVdF) as a binder and carbon as a conductive material were dispersed in a weight ratio of 92:4:4 in N-methyl-2-pyrrolidone to prepare a slurry of the positive electrode active material. The slurry was coated to a thickness of 15 μm on an aluminum foil, dried and rolled to produce a positive electrode plate. Artificial graphite as a negative electrode active material, styrene-butadiene rubber as a binder and carboxymethyl cellulose as a thickener were mixed in a ratio of 96:2:2 and dispersed in water to prepare a slurry of the negative electrode active material. The slurry was coated to a thickness of 10 μm on a copper foil, dried and rolled to produce a negative electrode plate.

A 16 μm-thick polyethylene (PE) separator was interposed between the electrodes, and the three layers were wound, pressed together and inserted into a prismatic can (46 mm×34 mm×50 mm).

$LiPF_6$ was added to a mixed solvent of ethylene carbonate, ethyl methyl carbonate and diethyl carbonate (1:1:1 (v/v)) until the final concentration of $LiPF_6$ reached 1.0 M, and the aromatic phosphate compound of Formula 1 (n=1, $R_1$ and $R_2=CH_3$) was added thereto to prepare an electrolyte. Then the aromatic phosphate compound was added in an amount of 0.5 parts by weight, based on 100 parts by weight of the electrolyte. The electrolyte was injected into the can to fabricate a lithium ion secondary battery.

Example 2

A lithium ion secondary battery was fabricated in the same manner as in Example 1 except that the aromatic phosphate compound of Formula 1 (n=1, $R_1$ and $R_2$=$CH_3$) was added in an amount of 5 parts by weight, based on 100 parts by weight of the electrolyte.

Example 3

A lithium ion secondary battery was fabricated in the same manner as in Example 1 except that the aromatic phosphate compound of Formula 1 (n=3, $R_1$ and $R_2$=$CH_3$) was added in an amount of 3 parts by weight, based on 100 parts by weight of the electrolyte.

Example 4

A lithium ion secondary battery was fabricated in the same manner as in Example 1 except that the aromatic phosphate compound of Formula 1 (n=1, $R_1$ and $R_2$=$CH_3$) and fluoroethylene carbonate (FEC) were added in amounts of 3 and 2 parts by weight, respectively, based on 100 parts by weight of the electrolyte.

Example 5

A lithium ion secondary battery was fabricated in the same manner as in Example 1 except that the aromatic phosphate compound of Formula 1 (n=1, $R_1$ and $R_2$=$CH_3$) and the aromatic phosphate compound of Formula 1 (n=5, $R_1$ and $R_2$=$CH_3$) were added in amounts of 4.5 and 0.5 parts by weight, respectively, based on 100 parts by weight of the electrolyte.

Comparative Example 1

A lithium ion secondary battery was fabricated in the same manner as in Example 1 except that the aromatic phosphate compound of Formula 1 was not added.

Comparative Example 2

A lithium ion secondary battery was fabricated in the same manner as in Example 1 except that triphenyl phosphate (TPP) was added in an amount of 5 parts by weight with respect to 100 parts by weight of the electrolyte, instead of the aromatic phosphate compound of Formula 1.

Overcharge and heat exposure tests were conducted on the batteries fabricated in Examples 1-5 and Comparative Examples 1-2. Increments in the thickness of the batteries were measured after storage at 60° C. for 7 days. Changes in the discharge capacity and capacity retention of the batteries were measured during repeated charge/discharge cycles. These measurements were made to evaluate the influence of the aromatic phosphate compounds on the overcharge characteristics, thermal characteristics and cycle life characteristics of the batteries.

Experimental Example 1

Overcharge Test

The batteries fabricated in Examples 1-5 and Comparative Examples 1-2 were overcharged with a constant current of 1C until their voltages reached 12V; the batteries were subsequently charged with a constant voltage of 12V at room temperature until the total charging time reached 3 hours. In these experimental examples, 'C' is a unit of 'C.-rate' that is a charge or discharge current rate of a battery expressed in amperes. The conditions of the batteries were observed. The results are shown in Table 1.

Experimental Example 2

High Temperature Exposure Test

After the batteries fabricated in Examples 1-5 and Comparative Examples 1-2 were left standing at 150° C. for 15 minutes, any changes in shapes of the batteries were observed. The results are also shown in Table 1.

Experimental Example 3

Evaluation of Swelling Stability

After the batteries fabricated in Examples 1-5 and Comparative Examples 1-2 were stored at 60° C. for 7 days, any increments in thickness of the batteries were measured. The results are also shown in Table 1. That is, Thickness increment (%)=$(B-A)/A$ A=the initial thickness
B=the thickness after storage at 60° C. for 7 days Experimental Example 4

Cycle Life Test

The batteries fabricated in Examples 1-5 and Comparative Examples 1-2 were charged with a constant current of 1C until their voltages reached 4.2V; the batteries were subsequently charged with a constant voltage of 4.2V at room temperature until the total charging time reached 3 hours. Then the batteries were discharged with a constant current of 1C until their voltages reached 3.0V. In these experimental examples, 'C' is a unit of 'C.-rate' that is the charge or discharge current rate of a battery expressed in amperes.

After 100 cycles of charging/discharging, the discharge capacity of each battery was measured and the capacity retention (%) of the battery was calculated by the following equation:

Capacity retention (%) at a given cycle=(Discharge capacity at a given cycle/Discharge capacity at the first cycle)×100

TABLE 1

| | Overcharge test result | Heat exposure test | Thickness increment (%) after storage at 60° C. for 7 days | Capacity retention (%) after 100 cycles of charging/discharging |
|---|---|---|---|---|
| Example 1 | Good | Good | 9.5 | 84 |
| Example 2 | Good | Good | 6.5 | 88 |
| Example 3 | Good | Good | 7.0 | 85 |
| Example 4 | Good | Good | 6.0 | 90 |
| Example 5 | Good | Good | 6.5 | 86 |
| Comparative Example 1 | Not good | Not good | 17.0 | 7 |
| Comparative Example 2 | Good | Not good | 13.0 | 60 |

The results in Table 1 show that exothermic reactions were suppressed in the batteries of Examples 1-5, each comprising at least one aromatic phosphate compound. An increase in the temperature of the batteries is prevented when the batteries were overcharged and as a result, no fire was observed in the batteries. Further, although the batteries were exposed to a high temperature of 150° C. for 15 minutes, there were no significant changes in the shape of the batteries. These results indicate improved safety of the batteries upon overcharge and after high-temperature storage. Further, the batteries showed good swelling stability after high-temperature storage as well as improved cycle life characteristics. As for the battery of Example 4, the combined use of the aromatic phosphate compound and fluoroethylene carbonate as an additive led to a further improvement in cycle life characteristics. In contrast, the battery of Comparative Example 4, using triphenyl phosphate as an additive, showed improved overcharge characteristics, but fire was observed in the battery after exposure to 150° C. for 10 minutes. The heat exposure characteristics, swelling characteristics and cycle life characteristics of the comparative battery (Comparative Example 4) were inferior to those of the example batteries of the present invention (Examples 1-5), each using at least one aromatic phosphate compound.

As is apparent from the above description, the lithium ion secondary battery of these aspects of present invention is safe even when overcharged. In addition, the lithium ion secondary battery of these aspects of the present invention has excellent characteristics in terms of high-temperature safety and swelling stability and exhibits improved cycle life characteristics.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte for a lithium ion secondary battery, comprising:
   a non-aqueous organic solvent,
   a lithium salt, and
   at least one aromatic phosphate compound represented by Formula 1,

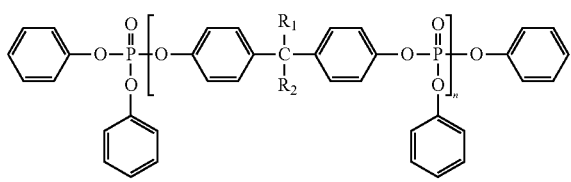

(1)

wherein n is an integer from 1 to 10, and $R_1$ and $R_2$ are each independently a $C_1$-$C_5$ alkyl group.

2. The electrolyte according to claim 1, wherein the aromatic phosphate compound is present in an amount of 0.5 to 5 parts by weight, based on 100 parts by weight of the electrolyte.

3. The electrolyte according to claim 1, wherein the electrolyte comprises a mixture of two or more aromatic phosphate compounds of Formula 1 with different n values.

4. The electrolyte according to claim 1, wherein the aromatic phosphate compound has an endothermic peak as determined by differential thermal analysis whose lowest point is in the range of 50 to 90° C.

5. The electrolyte according to claim 1, further comprising an ethylene carbonate-based compound represented by Formula 2:

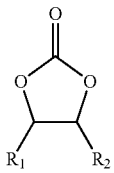

(2)

wherein $R_1$ and $R_2$ are each independently selected from the group consisting of hydrogen, halo, cyano (CN), nitro ($NO_2$), vinyl and $C_1$-$C_5$ fluoroalkyl, and $R_1$ and $R_2$ are not both hydrogen.

6. The electrolyte according to claim 5, wherein the ethylene carbonate-based compound is selected from the group consisting of difluoroethylene carbonate, chloroethylene carbonate, dichloroethylene carbonate, bromoethylene carbonate, dibromoethylene carbonate fluoroethylene carbonate, nitroethylene carbonate and cyanoethylene carbonate.

7. The electrolyte according to claim 6, wherein the ethylene carbonate-based compound is fluoroethylene carbonate.

8. The electrolyte according to claim 1, wherein the non-aqueous organic solvent is at least one solvent selected from the group consisting of a carbonate, an ester, an ether and a ketone.

9. The electrolyte according to claim 8, wherein the carbonate is at least one solvent selected from the group consisting of dimethyl carbonate, diethyl carbonate, dipropyl carbonate, methyl propyl carbonate, ethyl propyl carbonate, ethyl methyl carbonate, ethylene carbonate, propylene carbonate, butylene carbonate and pentylene carbonate.

10. The electrolyte according to claim 9, wherein:
the non-aqueous organic solvent further comprises an aromatic hydrocarbon-based organic solvent represented by Formula 3,

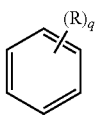

(3)

R is a halogen atom or a $C_1$-$C_{10}$ alkyl group, and
q is an integer from 0 to 6.

11. The electrolyte according to claim 10, wherein:
the aromatic hydrocarbon-based organic solvent is selected from the group of solvents consisting of benzene, fluorobenzene, bromobenzene, chlorobenzene, toluene, xylene and mesitylene, and
the volume ratio of the carbonate solvent to the aromatic hydrocarbon-based organic solvent is in the range of 1:1 to 30:1.

12. The electrolyte according to claim 8, wherein the ester is at least one solvent selected from the group consisting of methyl acetate, ethyl acetate, n-propyl acetate, butyl acetate, methyl propionate, ethyl propionate, γ-butyrolactone, decanolide, γ-valerolactone, δ-valerolactone, mevalonolactone and caprolactone.

13. The electrolyte according to claim 8, wherein the ether is at least one solvent selected from the group consisting of dibutyl ether, tetraglyme, diglyme, dimethoxyethane, 2-methyltetrahydrofuran and tetrahydrofuran.

14. The electrolyte according to claim 8, wherein the ketone is at least one solvent selected from the group consisting of cyclohexanone and polymethyl vinyl ketone.

15. The electrolyte according to claim 8, wherein the carbonate is a combination of a cyclic carbonate and a chain carbonate and the range of the mixing ratio is 1:1 (v/v) to 1:9 (v/v) cyclic carbonate to chain carbonate.

16. The electrolyte according to claim 15, wherein the cyclic carbonate is selected from the group of solvents consisting of ethylene carbonate, propylene carbonate, butylene carbonate and pentylene carbonate.

17. The electrolyte of claim 15, wherein the chain carbonate is selected from the group of solvents consisting of dimethyl carbonate, diethyl carbonate, dipropyl carbonate, methyl propyl carbonate, ethyl propyl carbonate and ethyl methyl carbonate.

18. The electrolyte according to claim 1, wherein the lithium salt is at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, and $LiN(C_pF_{2p+1}SO_2)(C_qF_{2q+1}SO_2)$ (p and q are natural numbers), LiCl and LiI.

19. The electrolyte according to claim 18, wherein the lithium salt is present in a concentration range of 0.1 to 2.0 M.

20. A lithium ion secondary battery, comprising:
a positive electrode including a positive electrode active material capable of reversibly inserting or removing lithium;
a negative electrode including a negative electrode active material capable of reversibly inserting or removing lithium; and
the electrolyte according to claim 1.

* * * * *

UNITED STATES PATENT AND TRADEMARK OFFICE
CERTIFICATE OF CORRECTION

| | | |
|---|---|---|
| PATENT NO. | : 8,043,749 B2 | Page 1 of 1 |
| APPLICATION NO. | : 12/510333 | |
| DATED | : October 25, 2011 | |
| INVENTOR(S) | : Jaehou Nah | |

It is certified that error appears in the above-identified patent and that said Letters Patent is hereby corrected as shown below:

In the Claims

Column 12, Claim 6, line 23.    Delete "dibromoethylene carbonate"

Insert -- dibromoethylene carbonate, --

Signed and Sealed this
Sixteenth Day of October, 2012

David J. Kappos
*Director of the United States Patent and Trademark Office*